United States Patent
Jansen et al.

(10) Patent No.: US 7,618,337 B2
(45) Date of Patent: Nov. 17, 2009

(54) OVERRUNNING DECOUPLER PULLEY WITH BARE WIRE SPRING AND GREASE LUBRICATION

(75) Inventors: Christian Jansen, Etobicoke (CA); John Antchak, Innisfil (CA)

(73) Assignee: Litens Automotove Partnership, Woodbridge, Ontario (CA)

( * ) Notice: Subject to any disclaimer, the term of this patent is extended or adjusted under 35 U.S.C. 154(b) by 680 days.

(21) Appl. No.: 10/519,591

(22) PCT Filed: Jul. 25, 2003

(86) PCT No.: PCT/CA03/01168

§ 371 (c)(1),
(2), (4) Date: Dec. 27, 2004

(87) PCT Pub. No.: WO2004/011818

PCT Pub. Date: Feb. 5, 2004

(65) Prior Publication Data

US 2005/0250607 A1 Nov. 10, 2005

(51) Int. Cl.
*F16H 59/00* (2006.01)
*F16H 61/00* (2006.01)
*F16H 63/00* (2006.01)
*F16H 7/00* (2006.01)
*F16H 9/00* (2006.01)

(52) U.S. Cl. .......... 474/74; 474/70; 192/41 S; 192/81 C (58) Field of Classification Search .......... 474/69, 474/70, 74; 192/26, 41 R, 41 S, 31, 81 C
See application file for complete search history.

(56) References Cited

U.S. PATENT DOCUMENTS 773,320 A * 10/1904 Haase .......... 464/57
2,396,985 A  3/1946 Burrus (Continued)

FOREIGN PATENT DOCUMENTS

EP  1 534 972  7/2003
WO  WO 01 92746  12/2001

OTHER PUBLICATIONS

Minutes from oral proceedings conducted at EPO on Jun. 21, 2007 in related EP Application No. 03 771 041.5 (now EP Patent No. 1534972).

(Continued)

*Primary Examiner*—Robert A Siconolfi
*Assistant Examiner*—Thomas W Irvin
(74) *Attorney, Agent, or Firm*—Harness, Dickey & Pierce, P.L.C.

(57) ABSTRACT

A decoupler assembly for transferring torque between a shaft and an endless power transmitting element. The decoupler assembly includes a clutch spring that is formed only of wire for transmitting rotary power between a carrier and a pulley. The decoupler assembly further includes a hub, that is configured to be coupled to a driven shaft, and a torsion spring that transmits rotary power between the carrier and the hub. A lubricant is disposed on the coils of the clutch spring. The pulley and the hub cooperate to define an annular cavity in which the torsion spring and the clutch spring are disposed. The torsion spring and the clutch spring are disposed axially between the carrier and the hub.

34 Claims, 5 Drawing Sheets

U.S. PATENT DOCUMENTS

| | | | |
|---|---|---|---|
| 2,551,739 A | 5/1951 | Harlan | |
| 2,633,953 A | 4/1953 | Gorske | |
| 2,794,524 A | 6/1957 | Sacchini | |
| 2,829,748 A | 4/1958 | Sacchini et al. | |
| 2,866,349 A | 12/1958 | Heckenthorn | |
| 2,885,896 A | 5/1959 | Hungerford, Jr. et al. | |
| 2,968,380 A | 1/1961 | Sacchini | |
| RE25,229 E | 8/1962 | Sacchini | |
| 3,059,493 A | 10/1962 | Wolfram | |
| 3,242,696 A * | 3/1966 | Kaplan | 464/40 |
| 3,298,486 A | 1/1967 | Perryman | |
| 3,618,730 A | 11/1971 | Mould | |
| 4,460,076 A | 7/1984 | Yamada | |
| 5,139,463 A | 8/1992 | Bytzek et al. | |
| 5,156,573 A * | 10/1992 | Bytzek et al. | 474/74 |
| 5,437,205 A | 8/1995 | Tseng | |
| 5,598,913 A | 2/1997 | Monahan et al. | |
| 5,879,254 A | 3/1999 | Tanaka | |
| 6,083,130 A * | 7/2000 | Mevissen et al. | 474/70 |
| 6,394,247 B1 | 5/2002 | Monahan et al. | |
| 6,394,248 B1 | 5/2002 | Monahan et al. | |
| 6,676,548 B2 * | 1/2004 | Fujiwara | 474/70 |
| 6,761,656 B2 * | 7/2004 | King et al. | 474/74 |
| 7,052,420 B2 * | 5/2006 | King et al. | 474/74 |
| 7,153,227 B2 * | 12/2006 | Dell et al. | 474/70 |
| 7,207,910 B2 * | 4/2007 | Dell et al. | 474/74 |
| 2003/0098215 A1 | 5/2003 | Miller et al. | |
| 2004/0112700 A1 * | 6/2004 | Liston et al. | 192/41 S |

OTHER PUBLICATIONS

Communication pursuant to Article 96(2) EPC dated May 5, 2006, in related EP Application No. 03 771 041.5.

Communication pursuant to Article 96(2) EPC dated Jun. 24, 2005 in related EP Application No. 03 771 041.5.

* cited by examiner

OVERRUNNING DECOUPLER PULLEY WITH BARE WIRE SPRING AND GREASE LUBRICATION

FIELD OF THE INVENTION

The invention relates to a belt drive assembly for driving belt driven accessories in an engine of an automotive vehicle, and more particularly, to a decoupling mechanism for allowing the belt driven accessories to operate temporarily at a speed other than the belt drive assembly.

DESCRIPTION OF THE RELATED ART

It is widely known in an automotive vehicle engine to transfer a portion of the engine output to a plurality of belt driven accessories utilizing an endless serpentine belt. Typically, each component includes an input drive shaft and a pulley coupled to a distal end of the drive shaft for driving engagement with the belt. An example of such a belt driven accessory is an alternator.

It is also known to provide a decoupler operatively coupled between the pulley and the alternator to allow the alternator drive shaft to "overrun" or rotate at a faster speed than the pulley and to allow the speed of the pulley to oscillate with respect to the alternator drive shaft due to oscillations in the engine speed.

Examples of decouplers are disclosed in the U.S. Pat. No. 6,083,130, issued to Mevissen et al. on Jul. 4, 2000 and the U.S. Pat. No. 5,139,463, issued to Bytzek et al. on Aug. 18, 1992.

It remains desirable to provide a decoupler that is easier to manufacture and has better durability over conventional decoupler designs.

SUMMARY OF THE INVENTION

In one form the present teachings provide a decoupler assembly for transferring torque between a shaft and an endless power transmitting element. The decoupler assembly can include a hub, a carrier, a torsion spring, a pulley, a clutch spring and a lubricant. The hub is configured to be coupled to the shaft such that the shaft co-rotates with the hub about a rotational axis. The carrier is rotatable relative to the hub. The torsion spring is concentric with the rotational axis of the hub and extends between a hub end and a carrier end and is configured to transfer rotary power between the hub and carrier. The pulley is rotatably coupled to the hub and has an outer periphery that is configured to engage the endless power transmitting element. The pulley has an inner surface formed therein. The clutch spring is formed only of wire and includes a first end, which is fixedly coupled to the carrier, a second end, which is located opposite the first end, and a plurality of coils that are disposed between the first and second ends. The clutch spring exits the carrier and extends toward the inner surface of the pulley such that at least one of the plurality of coils is engaged against the inner surface of the pulley when rotary power is transmitted from the pulley to the hub. The plurality of coils are configured to contract to at least reduce gripping engagement between the plurality of coils and the inner surface of the pulley in response to deceleration of the pulley relative to the carrier beyond a predetermined extent to permit the hub to rotate at a speed in excess of the pulley. The lubricant is disposed on coils of the clutch spring. The pulley and the hub cooperate to define an annular cavity in which the torsion spring and the clutch spring are disposed. The torsion spring and the clutch spring are disposed axially between the carrier and the hub.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
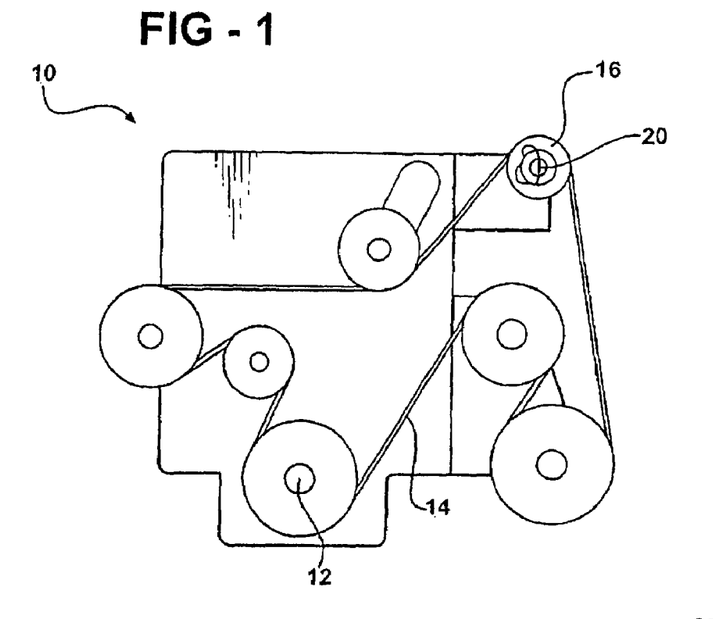
FIG. 1 is a front view of an engine of an automotive vehicle incorporating a decoupler assembly according to one aspect of the invention.

Referring to the figures, an engine for an automotive vehicle is generally indicated at 10 in FIG. 1. The engine 10 includes a crankshaft 12 driving an endless serpentine belt 14, as commonly known by those having ordinary skill in the art. The engine 10 also includes a belt driven accessory 16 driven by the belt 14. Described in greater detail below, a decoupler assembly 20 is operatively assembled between the belt 14 and the belt driven accessory 16 for automatically decoupling the belt driven accessory 16 from the belt 14 when the belt 14 decelerates relative to the belt driven accessory 16 and allowing the speed of the belt 14 to oscillate relative to the belt driven accessory 16. Additionally, a detailed description of the structure and function of a decoupler assembly can be found in applicant's U.S. Pat. No. 6,083,130, which issued on Jul. 4, 2000 and is incorporated herein by reference in its entirety.

Figure 2:
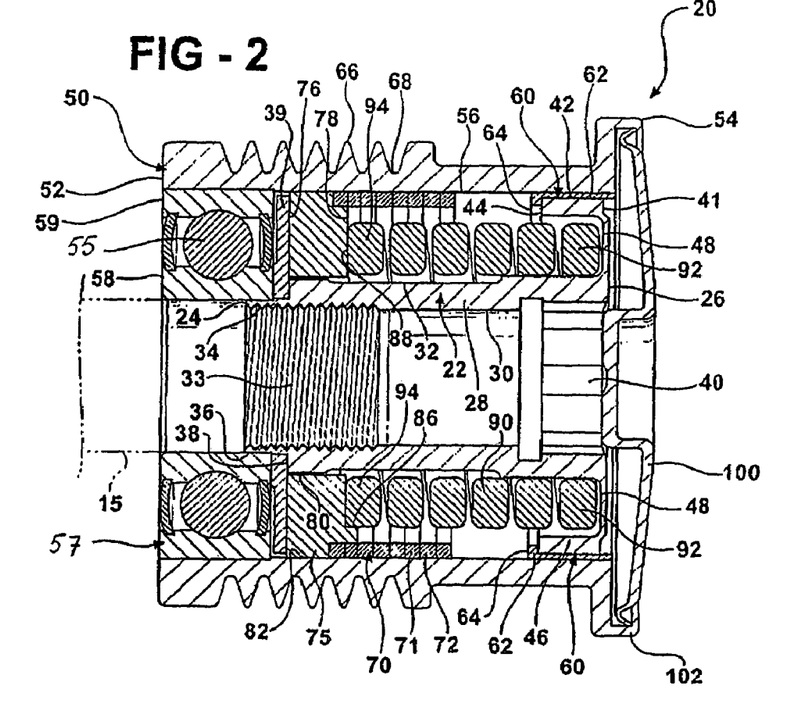
FIG. 2 is an enlarged fragmentary sectional view of the decoupler assembly.

Referring to FIG. 2, the decoupler assembly 20 includes a hub 22 having opposite first 24 and second 26 ends and a generally cylindrical body 28 extending axially therebetween. The body 28 includes opposite inner 30 and outer 32 surfaces extending between the first 24 and second 26 ends of the hub 22. The inner surface 30 includes a plurality of inner threads 33 adjacent the first end 24 for fixedly securing the hub 22 to a drive shaft 15 from the belt driven accessory 16. A reduced diameter portion 34 is formed in the first end 24. The reduced diameter portion 34 includes an outer mounting surface 36 having a smaller outer diameter than the body 28. An abutment surface 38 opposite the second end 26 extends generally radially between the outer mounting surface 36 and the body 28. An annular thrust washer 39 is seated on the outer mounting surface 36 adjacent the abutment surface 38.

A socket 40 is formed in the second end 26 for receiving a suitable tool therein for rotatably threading the hub 22 onto the drive shaft 15. An annular first flange 41 extends radially outwardly from the body 28 adjacent the second end 26. The first flange 41 includes an outer flange surface 42 having a larger outer diameter than the body 28. An annular surface 44 extends generally radially between the body 28 and the outer flange surface 42 opposite the second end 26. A generally helical first slot 46 is formed in the annular surface 44 defining a first locating surface 48 therein.

A generally cylindrical pulley 50 is rotatably journaled to the hub 22. More specifically, the pulley 50 extends between opposite first 52 and second 54 ends. The pulley 50 includes an inner surface 56 extending between the first 52 and second 54 ends. A ball bearing member 57 is coupled between the pulley 50 and the hub 22. The bearing member 57 includes an inner race 58 fixedly secured to a portion of the outer mounting surface 36 and an outer race 59 fixedly secured to a portion of the inner surface 56 adjacent the first end 52 of the pulley 50. A plurality of ball bearings 55 is rollingly engaged between the inner 58 and outer 59 races of the bearing member 57. A cylindrical bushing 60 is journal mounted between the pulley 50 and the first flange 41. The bushing 60 includes a sleeve wall 62 extending between a portion of the inner surface 56 adjacent the second end 54 and the outer flange surface 42 of the first flange 41. A bushing flange 64 extends radially inwardly from the sleeve wall 62 and abuts the annular surface 44 in the first flange 41.

The pulley 50 includes an outer periphery 66 with a plurality of V-shaped grooves 68 formed therein for rollingly engaging and guiding the belt 14.

Referring to FIGS. 2-5, a one-way clutch assembly 70 is operatively coupled between the hub 22 and the pulley 50. The clutch assembly 70 includes a clutch spring 71 and a carrier 75. The clutch spring 71 includes a plurality of helical coils 72 extending between a bent or hooked proximal end 73 and an opposite distal end 74. Preferably, the clutch spring 71 is formed from an uncoated, spring steel material and has a non-circular cross-section to improve frictional contact. Most preferably, the cross-section of clutch spring 71 is rectangular or square. The clutch spring 71 is press fitted into frictional engagement with the inner surface 56 of the pulley 50. Preferably, a lubricant similar or compatible with grease used in the ball bearing member 57 is applied to minimize wear between the clutch spring 71 and the inner surface 56 of the pulley 50.

Figures 3, 4, 5:
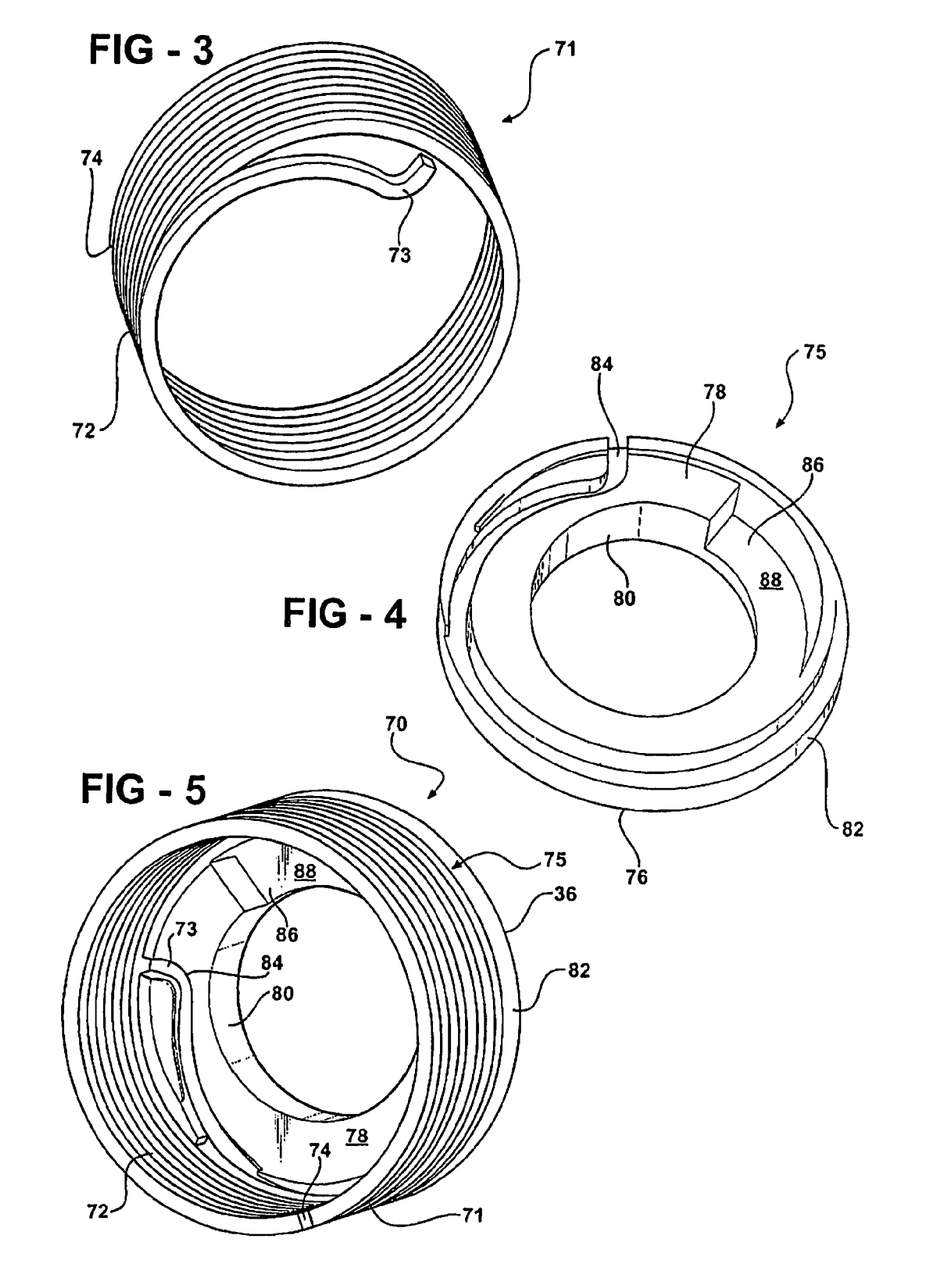
FIG. 3 is a perspective view of a clutch spring in the decoupler assembly.
FIG. 4 is a perspective view of a carrier for carrying one end of the clutch spring in the decoupler assembly.
FIG. 5 is a perspective view of the clutch spring assembled to the carrier.

The carrier 75 is rotatably mounted on the hub 22. The carrier 75 is generally ring shaped and extends axially between opposite first and second sides 76, 78. The carrier 75 defines a generally cylindrical inner surface 80 and a generally cylindrical outer surface 82. A hooked slot 84 is formed in the second side 78 of the carrier 75 and is configured to retain the hooked proximal end 73 of the clutch spring 71. A generally helical second slot 86 is formed in the second side 78 of the carrier 75 defining a second locating surface 88 generally opposing the first locating surface 48 formed in the annular surface 44.

Referring to FIG. 2, a helical torsion spring 90 extends between hub 92 and carrier 94 ends. The torsion spring 90 is axially compressed between the first 48 and second 88 locating surfaces for transferring torque between the hub 22 and the carrier 75. More specifically, the hub end 92 of the torsion spring 90 is retained in the first slot 46 of the hub 22. Similarly, the carrier end 94 of the torsion spring 90 is retained in the second slot 86 in the second side 78 of the carrier 75. Axial forces due to the compression of the torsion spring 90 retains the first side 76 of the carrier 75 in abutting engagement with the thrust washer 39. The torsion spring 90 also allows relative movement between the carrier 75 and the hub 22 to accommodate changes in the speed of the pulley 50 due to generally oscillating changes in the operating speed of the engine. The torsion spring 90 and the clutch spring 71 are coiled in opposite directions.

A cap 100 is fixedly assembled to a flange 102 formed in the pulley 50 for preventing contaminants from entering the decoupler assembly 20 and for retaining the lubricant within the decoupler assembly 20.

In operation, the engine 10 is started and the pulley 50 is accelerated and rotated in a driven direction by the belt 14 driven by the engine 10. Acceleration and rotation of the pulley 50 in the driven direction relative to the hub 22 creates friction between the inner surface 56 of the pulley 50 and preferably all of the coils 72 of the clutch spring 71. It should be appreciated that the clutch spring 71 will function even where at the onset at least one of the coils 72 of the clutch spring 71 is frictionally engaged with the inner surface 56 of the pulley 50. The clutch spring 71 is helically coiled such that the friction between the inner surface 56 of the pulley 50 and at least one of the coils 72 would cause the clutch spring 71 to expand radially outwardly toward and grip the inner surface 56 of the pulley 50. Continued rotation of the pulley 50 in the driven direction relative to the hub 22 would cause a generally exponential increase in the outwardly radial force applied by the coils 72 against the inner surface 56 until all of the coils 72 of the clutch spring 71 become fully brakingly engaged with the pulley 50. When the clutch spring 71 is fully engaged with the inner surface 56, the rotation of the pulley 50 is fully directed toward rotation of the drive shaft 15 of the belt driven accessory 16. Additionally, centrifugal forces help to retain the clutch spring 71 in braking engagement with the inner surface 56 of the pulley 50.

The rotational movement of the carrier 75 in the driven direction is transferred to the hub 22 by the torsional spring 90 such that generally the carrier 75, thrust washer 39, hub 22, and the drive shaft 15 from the belt driven accessory 16 rotate together with the pulley 50. Additionally, the torsional spring 90 resiliently allows relative movement between the carrier 75 and the hub 22 to accommodate oscillations in the speed of the pulley 50 due to corresponding oscillations in the operating speed of the engine 10.

When the pulley 50 decelerates, the hub 22 driven by the inertia associated with the rotating drive shaft 15 and the rotating mass within the belt driven accessory 16 will initially "overrun" or continue to rotate in the driven direction at a higher speed than the pulley 50. More specifically, the higher rotational speed of the hub 22 relative to the pulley 50 causes the clutch spring 71 to contract radially relative to the inner surface 56 of the pulley 50. The braking engagement between the clutch spring 71 and the pulley 50 is relieved, thereby allowing overrunning of the hub 22 and drive shaft 15 from the belt driven accessory 16 relative to the pulley 50. The coils 72 may remain frictionally engaged with the inner surface 56 while the pulley 50 decelerates relative to the clutch assembly 70 and the hub 22. The coils 72 of the clutch spring 71 begin to brakingly reengage the inner surface 56 as the pulley 50 accelerates beyond the speed of the hub 22.

Figure 6:
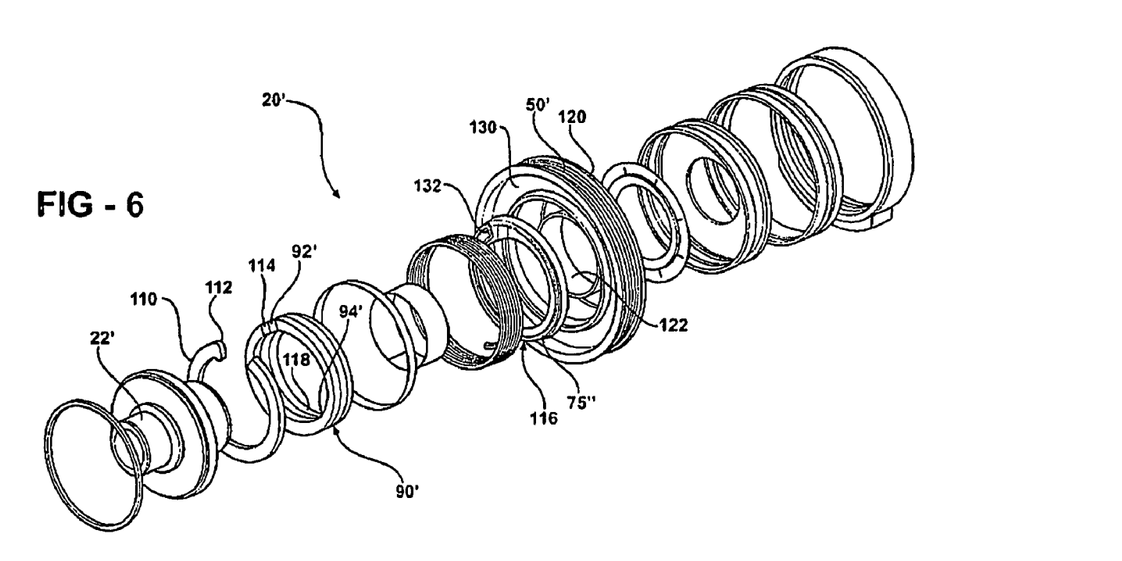
FIG. 6 is an exploded perspective view of the decoupler assembly according to a second embodiment of the invention.
Figure 7:
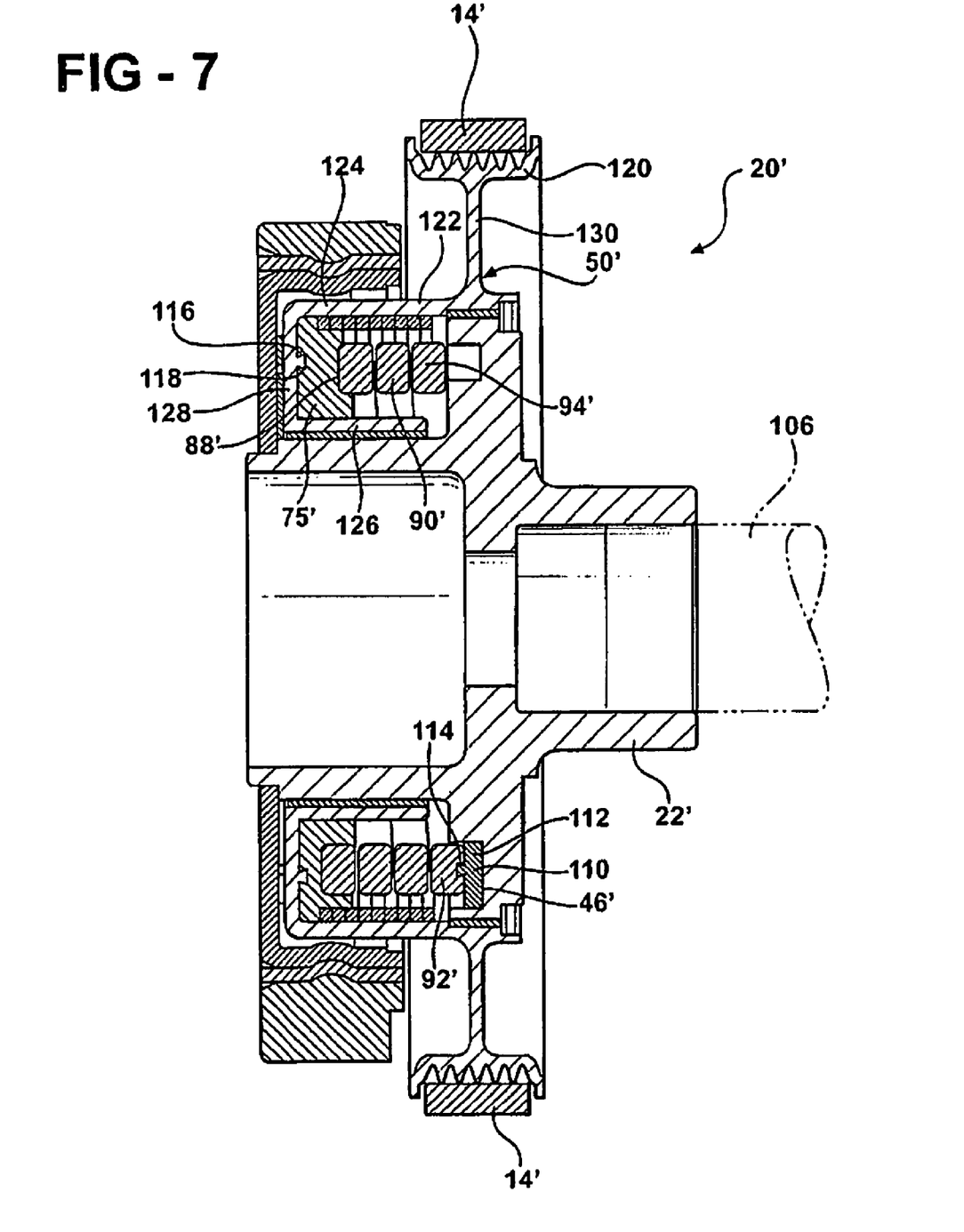
FIG. 7 is a cross sectional view of the decoupler assembly according to the second embodiment of the invention.

Referring to FIGS. 6 and 7, a second embodiment of the decoupler assembly 20' is shown, wherein elements of the alternative embodiment similar to those in the first embodiment are indicated by primed reference characters. The decoupler assembly 20' is assembled between an output or crankshaft 106 of an engine and the belt 14' to allow the belt 14' to overrun the crankshaft 106. The decoupler assembly 20' includes a generally ring-shaped spring support 110. The slot 46' of the hub 22' has a generally U-shaped cross section for retaining the spring support 110 therein.

A first tab 112 extends outwardly from the spring support 110. A first notch 114 is formed in the hub end 92' of the torsion spring 90' for axially receiving the first tab 112 therein. Engagement between the first tab 112 and the first notch 114 prevents relative rotational movement of the hub end 92' of the torsion spring 90' relative to the spring support 110 and hub 22'. Similarly, a second tab 116 extends outwardly from the second locating surface 88' of the carrier 75'. A second notch 118 is formed in the carrier end 94' of the torsion spring 90' for axially receiving the second tab 116 therein. Engagement between the second tab 116 and the second notch 118 prevents relative rotational movement of the carrier end 94' of the torsion spring 90' relative to the carrier 75'.

The pulley 50' includes an outer periphery 120 for seating the belt 14' therein and an inner flange portion 122. The inner flange portion 122 has a generally U-shaped cross section defined by outer 124 and inner 126 pulley walls and a first connecting wall 128 extending radially therebetween. The carrier 75' is retained between the outer 124 and inner 126 pulley walls and the first connecting wall 128 of the inner flange portion 122, such that the carrier 75' rotates with the pulley 50'. A second connecting wall 130 extends radially between the outer pulley wall 124 and the outer periphery 120.

The carrier 75' includes a slot or split 132, which helps the carrier 75' to flex and accommodate loads associated with the rotation of the decoupler assembly 20'.

Figure 8:
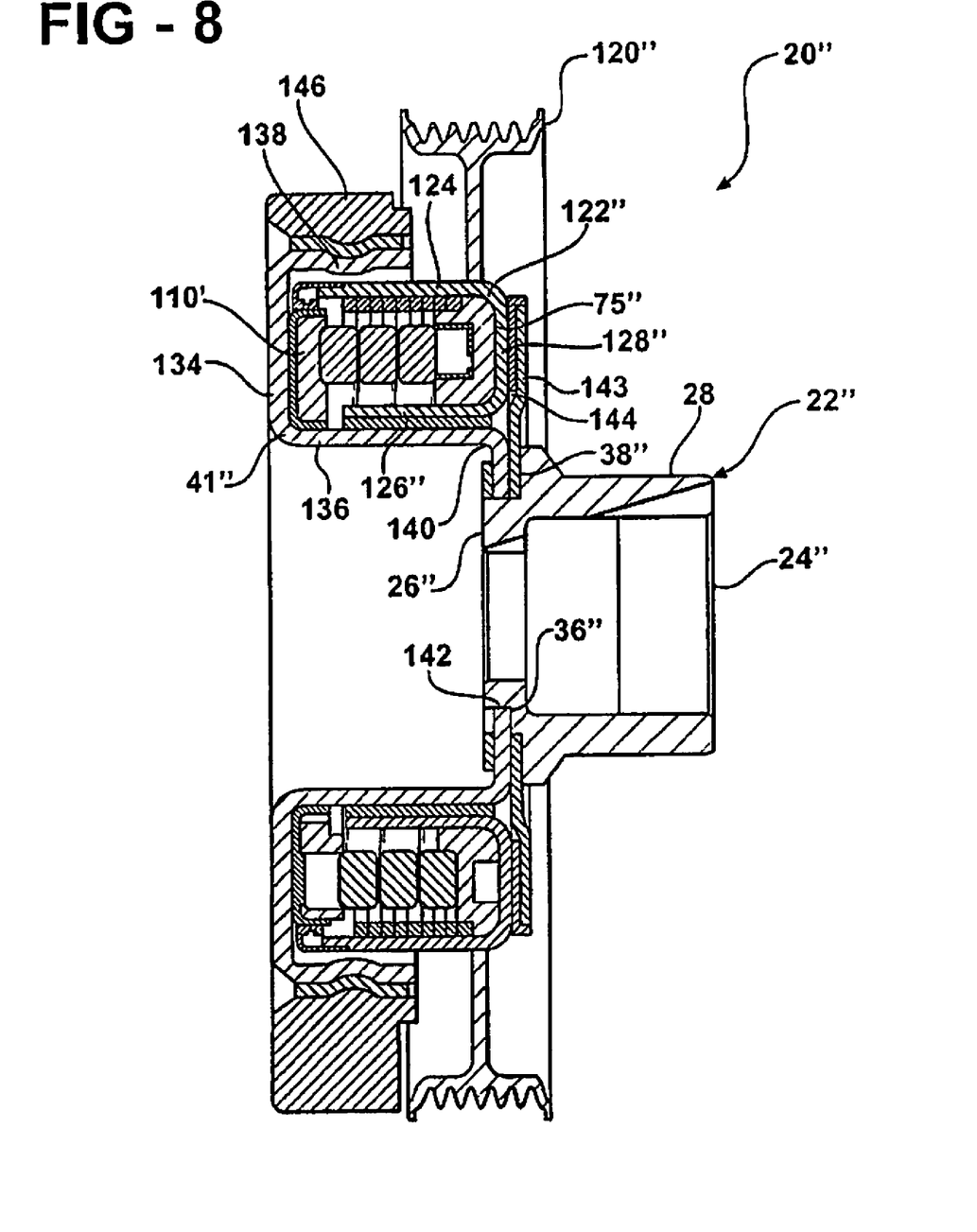
FIG. 8 is a cross sectional view of the decoupler assembly according to a third embodiment of the invention.

Referring to FIG. 8, a third embodiment of the decoupler assembly 20" is shown, wherein the body 28" and first flange 41" of the hub 22" are formed separately and fixedly connected in a subsequent assembly operation. The body 28" of the hub 22" is generally cylindrical and extends between the first 24" and second 26" ends. The first flange 41" includes a mounting portion 140, which has a center bore 142 for receiving the outer flange surface 36" of the hub 22" therethrough. The first flange 41" includes a generally U-shaped cross section defined by an end wall 134 extending radially between generally parallel inner 136 and outer 138 flange walls. The spring support 110" is retained between the inner 136 and outer 138 flange walls and the end wall 134, such that the spring support 110" rotates with the first flange 41".

The outer periphery 120" and the inner flange portion 122" of the pulley 50" are formed separately and fixedly connected in a subsequent assembly operation using any suitable method, such as welding. The generally U-shaped cross section of the inner flange portion 122" opens toward the first flange 41". The carrier 75" is retained between the outer 124" and inner 126" pulley walls and the first connecting wall 128", such that the carrier 75" rotates with the pulley 50".

A ring plate 143 is mounted concentrically onto the outer mounting surface 36" adjacent the abutment surface 38". A thrust washer 144 is disposed between the first flange 41" and the ring plate 143. The thrust washer 144 is axially spaced apart from the end wall 134 of the flange 41" for receiving the inner flange portion 122" of the pulley 50" therebetween.

A torsional vibration damper 146, as known by those skilled in the art, is fixedly secured to the outer flange wall 138 of the first flange 41" for dampening vibrations experienced at the crankshaft 106 associated with the operations of the engine.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A decoupler assembly for transferring torque between a shaft and an endless power transmitting element, said decoupler assembly comprising:
    a hub that is adapted to be coupled to the shaft such that the shaft co-rotates with the hub about a rotational axis;
    a carrier that is rotatable relative to the hub;
    a torsion spring concentric with the rotational axis and extending between a hub end and a carrier end for transferring rotary power between the hub and carrier;
    a pulley rotatably coupled to the hub, the pulley having an outer periphery that is adapted to engage the endless power transmitting element, the pulley having an inner surface formed therein;
    a clutch spring formed only of wire, the clutch spring having a first end that is fixedly coupled to the carrier, a second end opposite the first end and a plurality of coils between the first and second ends, the clutch spring exiting the carrier and extending toward the inner surface of the pulley such that at least one of the plurality of coils is engaged against the inner surface of the pulley when rotary power is transmitted from the pulley to the hub, the plurality of coils contracting to at least reduce gripping engagement between the plurality of coils and the inner surface of the pulley in response to deceleration of the pulley relative to the carrier beyond a predetermined extent to permit the hub to rotate at a speed in excess of the pulley;
    a lubricant disposed on coils of the clutch spring,
    wherein the pulley and the hub cooperate to define an annular cavity in which the torsion spring and the clutch spring are disposed and wherein the torsion spring and the clutch spring are disposed axially between the carrier and the hub.

2. The decoupler assembly of claim 1, wherein the clutch spring exits the carrier in a radially outward direction.

3. The decoupler assembly of claim 1, wherein the torsion spring and the clutch spring are coiled in opposite directions.

4. The decoupler assembly of claim 1, wherein the torsion spring uncoils as a magnitude of the rotary power transmitted between the carrier and the hub increases.

5. The decoupler assembly of claim 4, wherein at least one of the carrier and the hub includes a tapered ramp and an abutting wall that is perpendicular to the tapered ramp and wherein the torsion spring abuts each of the abutting walls.

6. The decoupler assembly of claim 1, wherein the carrier is mounted on the hub.

7. The decoupler assembly of claim 1, wherein the wire has a cross-sectional shape with an outer side that abuts the inner surface of the pulley, the outer side having a contour that is configured to distribute load transmitted from the clutch spring to the pulley over multiple points of contact spaced along the outer side.

8. The decoupler assembly of claim 7, wherein the outer side has a flat contour.

9. The decoupler assembly of claim 8, wherein the wire has a square cross-sectional shape or a rectangular cross-sectional shape.

10. The decoupler assembly of claim 1, wherein the wire has a cross-sectional shape with an outer side, which abuts the inner surface of the pulley, and lateral sides that are coupled to the opposite lateral sides of the outer side, the lateral sides having a flat contour.

11. The decoupler assembly of claim 10, wherein the wire has a square cross-sectional shape or a rectangular cross-sectional shape.

12. The decoupler assembly of claim 1, wherein the torsion spring is axially compressed between the carrier and the hub.

13. The decoupler assembly of claim 1, further comprising a bearing disposed between the hub and the pulley.

14. The decoupler assembly of claim 1, wherein the plurality of coils are abutted against one another.

15. The decoupler assembly of claim 1, wherein the first end of the clutch spring is received into a helical groove that is formed on the carrier.

16. The decoupler assembly of claim 15, wherein the helical groove is formed on an axial end face of the carrier.

17. The decoupler assembly of claim 1, wherein the lubricant is a grease.

18. The decoupler assembly of claim 17, wherein the clutch spring exits the carrier in a radially outward direction.

19. The decoupler assembly of claim 17, wherein the torsion spring and the clutch spring are coiled in opposite directions.

20. The decoupler assembly of claim 17, wherein the torsion spring uncoils as a magnitude of the rotary power transmitted between the carrier and the hub increases.

21. The decoupler assembly of claim 20, wherein at least one of the carrier and the hub includes a tapered ramp and an abutting wall that is perpendicular to the tapered ramp and wherein the torsion spring abuts each of the abutting walls.

22. The decoupler assembly of claim 17, wherein the carrier is mounted on the hub.

23. The decoupler assembly of claim 17, wherein the wire has a cross-sectional shape with an outer side that abuts the inner surface of the pulley, the outer side having a contour that is configured to distribute load transmitted from the clutch spring to the pulley over multiple points of contact spaced along the outer side.

24. The decoupler assembly of claim 23, wherein the outer side has a flat contour.

25. The decoupler assembly of claim 24, wherein the wire has a square cross-sectional shape or a rectangular cross-sectional shape.

26. The decoupler assembly of claim 17, wherein the wire has a cross-sectional shape with an outer side, which abuts the inner surface of the pulley, and lateral sides that are coupled to the opposite lateral sides of the outer side, the lateral sides having a flat contour.

27. The decoupler assembly of claim 26, wherein the wire has a square cross-sectional shape or a rectangular cross-sectional shape.

28. The decoupler assembly of claim 17, wherein the torsion spring is axially compressed between the carrier and the hub.

29. The decoupler assembly of claim 17, further comprising a bearing disposed between the hub and the pulley.

30. The decoupler assembly of claim 17, wherein the plurality of coils are abutted against one another.

31. The decoupler assembly of claim 17, wherein the first end of the clutch spring is received into a helical groove that is formed on the carrier.

32. The decoupler assembly of claim 31, wherein the helical groove is formed on an axial end face of the carrier.

33. A decoupler assembly for transferring torque between a shaft and an endless power transmitting element, said decoupler assembly comprising:
   a hub that is adapted to be coupled to the shaft such that the shaft co-rotates with the hub about a rotational axis;
   a carrier that is rotatably mounted on the hub;
   a torsion spring concentric with the rotational axis of the hub and extending between a hub end and a carrier end for transferring rotary power between the hub and carrier, the torsion spring being axially compressed between the carrier and the hub and uncoiling as a magnitude of the rotary power transmitted between the carrier and the hub increases;
   a pulley rotatably coupled to the hub, the pulley having an outer periphery that is adapted to engage the endless power transmitting element, the pulley having an inner surface formed therein;
   a clutch spring formed only of wire with a square or rectangular cross-sectional shape, the clutch spring having a first end that is fixedly coupled to the carrier, a second end opposite the first end and a plurality of coils between the first and second ends, the clutch spring exiting the carrier in a radially outward direction and extending toward the inner surface of the pulley such that at least one of the plurality of coils is engaged against the inner surface of the pulley when rotary power is transmitted from the pulley to the hub, the plurality of coils contracting to at least reduce gripping engagement between the plurality of coils and the inner surface of the pulley in response to deceleration of the pulley relative to the carrier beyond a predetermined extent to permit the hub to rotate at a speed in excess of the pulley;
   a bearing disposed between the hub and the pulley; and
   a lubricant disposed on coils of the clutch spring;
   wherein the torsion spring and the clutch spring are coiled in opposite directions:
   wherein the pulley and the hub cooperate to define an annular cavity in which the torsion spring and the clutch spring are disposed and wherein the torsion spring and the clutch spring are disposed axially between the carrier and the hub; and
   wherein at least one of the carrier and the hub includes a tapered ramp and an abutting wall that is perpendicular to the tapered ramp and wherein the torsion spring abuts each of the abutting walls.

34. The decoupler assembly of claim 33, wherein the lubricant is a grease.

* * * * *